(12) United States Patent
Hajjar et al.

(10) Patent No.: US 6,496,468 B2
(45) Date of Patent: *Dec. 17, 2002

(54) BEAM FOCUSING IN NEAR-FIELD OPTICAL RECORDING AND READING

(75) Inventors: Roger Hajjar, Santa Clara, CA (US); Gordon S. Kino, Stanford, CA (US)

(73) Assignee: Terastor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,838

(22) Filed: May 29, 1998

(65) Prior Publication Data

US 2001/0050896 A1 Dec. 13, 2001

(51) Int. Cl.⁷ .......................... G11B 7/135; G11B 11/00
(52) U.S. Cl. ................. 369/113.34; 369/13.33
(58) Field of Search .................. 369/112, 44.23, 369/44.41, 94, 44.14, 13.33, 112.24, 112.23

(56) References Cited

U.S. PATENT DOCUMENTS

| | | | |
|---|---|---|---|
| 4,987,292 A | 1/1991 | Howard | 369/44.41 |
| 5,004,307 A | 4/1991 | Kino et al. | 359/356 |
| 5,121,256 A | 6/1992 | Corie et al. | 359/664 |
| 5,125,750 A | 6/1992 | Corie et al. | 359/664 |
| 5,446,565 A | 8/1995 | Komma et al. | 369/94 |
| 5,497,359 A | 3/1996 | Mamin et al. | 369/112 |
| 5,504,731 A | 4/1996 | Lee et al. | 369/112 |
| 5,625,609 A | 4/1997 | Latta et al. | 369/44.23 |
| 5,673,241 A | 9/1997 | Koyama et al. | 369/44.23 |
| 5,677,903 A | 10/1997 | Holtslag et al. | 369/112 |
| 5,689,480 A * | 11/1997 | Kino | 369/112 |
| 5,764,613 A | 6/1998 | Yamamoto et al. | 369/112 |
| 5,917,788 A * | 6/1999 | Mowry | 369/44.23 |
| 5,936,928 A * | 8/1999 | Jain et al. | 369/44.23 |
| 6,023,378 A * | 2/2000 | Schaenzer | 369/44.23 |
| 6,041,031 A * | 3/2000 | Ichimura et al. | 369/112 |

OTHER PUBLICATIONS

M. Mansuripur, "Certain computational aspects of vector diffraction problems", Jun. 1989, Journal of the Optical Society of America vol. 6, No. 5, pp. 786–805.

M. Mansuripur, "Analysis of multiplayer thin–film structures containing magneto–optic and anisotropic media at oblique incidence using 2×2 matrices", May 15, 1990, Journal of Applied Physics, vol. 67, No. 10, pp. 6466–6475.

Yamamoto et al., "A 0.8 Numerical Aperture Two Element Objective Lents for the Optical Disk", Jul., 1996, ISOM/ODS'96, pp. 43a–43c.

S. M. Mansfield, "High–numerical–aperture lens system for optical storage", Feb. 15, 1993, Optics Letters, vol. 18, No. 4, pp. 305–307.

S. Hayashi and G. S. Kino, "Solid Immersion Lens for Optical Storage", Feb. 1995, SPIE's Symposium on Electronic Imaging Science & Technology (IS&T).

* cited by examiner

Primary Examiner—W. R. Young
Assistant Examiner—Kim-Kwok Chu
(74) Attorney, Agent, or Firm—Fish & Richardson P.C.

(57) ABSTRACT

A near-field optical storage system having an optical train configured to produce a reduced beam spot size at the recording layer of an optical medium. A near-field coupling element having a substantially flat surface is implemented to provide optical coupling between the optical train and the optical medium. The flat surface is spaced from the optical medium by a fraction of the operating wavelength. An optical beam is focused beyond the flat surface in order to achieve a small spot size on the recording layer.

19 Claims, 7 Drawing Sheets

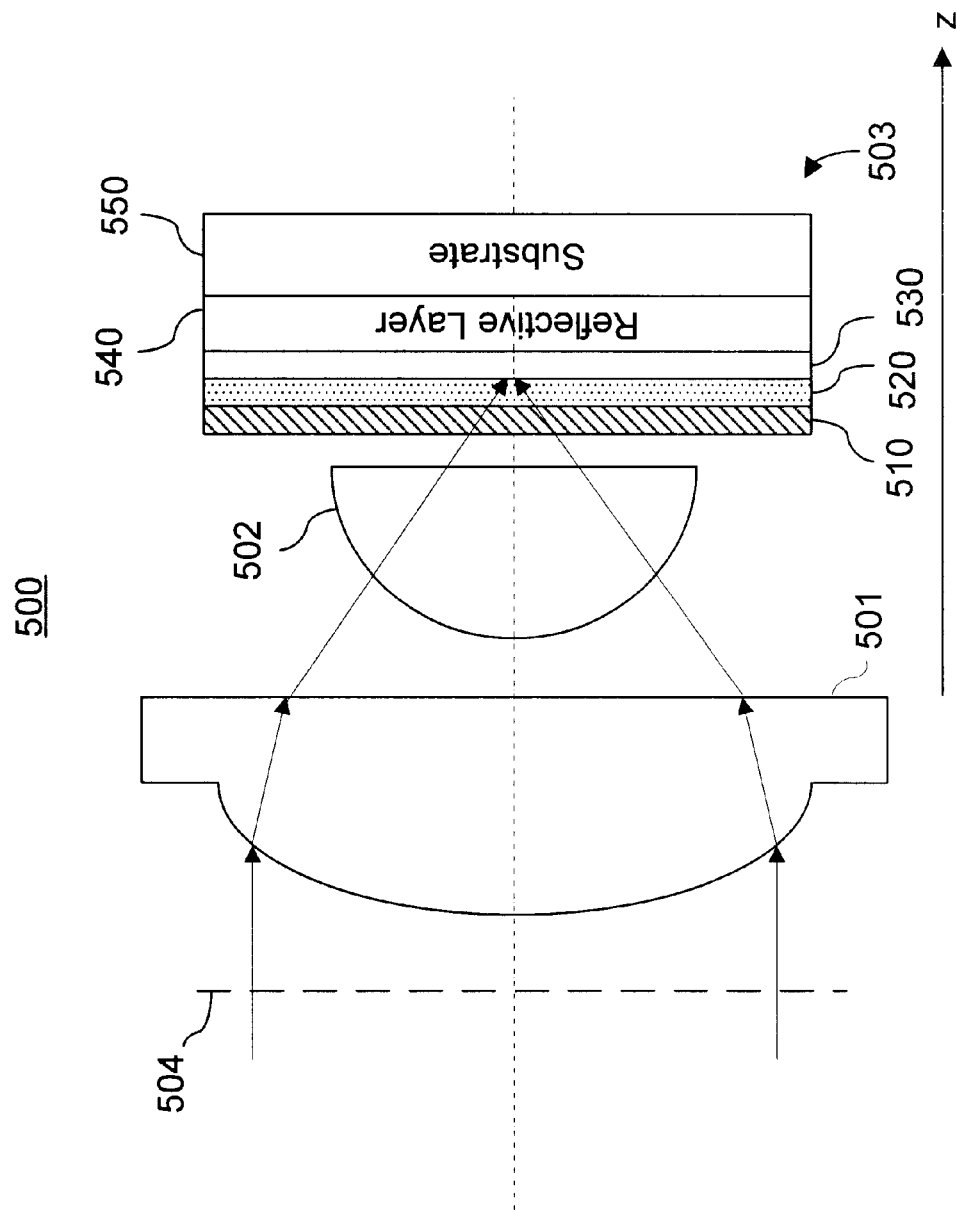

BEAM FOCUSING IN NEAR-FIELD OPTICAL RECORDING AND READING

FIELD OF THE INVENTION

The present invention generally relates to optical recording and reading, and more particularly, to a near-field optical storage system.

BACKGROUND OF THE INVENTION

Optical storage can be used to achieve high areal density data storage by using a tightly focused laser beam. For example, electro-optical data storage systems based on magneto-optical materials can be configured to produce an areal data density on the order of one gigabit per square inch.

A monochromatic optical beam can be focused to a small spot by using an optical focusing module with a large numerical aperture. This can produce a minimum spot size on the order of one wavelength due to the diffraction limit. The areal density of an optical storage device, in principle, is limited by this diffraction-limited spot size.

One technique for increasing the areal data density is to reduce the spot size of a beam within the diffraction limit by using light sources of short wavelengths, such as lasers toward the blue end of the optical spectrum.

Another technique focuses an optical beam onto the flat surface of a solid transparent material with a high refractive index. The diffraction-limited focused spot size is hence reduced by a factor of the refractive index compared to the spot size in air.

The optical energy can be coupled between the optical focusing module and the surface of an optical recording medium via evanescent fields by placing the medium surface near the surface of the solid material, typically closer than one wavelength, to form a near-field configuration. For example, U.S. Pat. No. 5,125,750 to Corle and Kino discloses a near-field optical recording system based on a solid immersion lens. In a near-field configuration, the numerical aperture of the optical focusing module can be greater than unity which is beyond the diffraction limit in air.

SUMMARY OF THE INVENTION

The present invention is embedded in an electro-optical data storage system in a near-field configuration. This system includes an optical train which has a near-field lens for coupling optical energy to and from a recording layer in an optical storage medium. The near-field lens is spaced from the surface of the medium by an air gap typically less than one wavelength in thickness. The optical coupling between the near-field lens and the optical medium is effected by both the optical propagation and evanescent coupling through the air gap.

The optical train of the system is preferably configured to focus an optical beam at a location beyond the position of the recording layer in the optical medium by a desired defocus distance in the absence of the optical medium in order to achieve a minimum or significantly reduced beam spot size on the recording layer in presence of the optical medium. This increases the storage density on the recording layer. The defocus distance is determined by properties and configurations of the objective lens, the near-field lens, the air gap, and the optical medium.

One embodiment of the system includes an objective lens to receive and focus a collimated beam to the near-field lens. The objective lens and the near-field lens are spaced from each other to achieve the desired defocus at or near the exiting surface of the near-field lens so that the beam spot at the recording layer is minimized or significantly reduced.

Another embodiment uses an aspherical objective lens to include effects of refraction of the beam at the interface of the near-field lens and the air gap and spherical aberrations of the objective lens and the near-field lens to achieve the desired defocus.

Yet another embodiment uses a divergent beam instead of a collimated beam to impinge on the objective lens. The amount of divergence is set at a predetermined value to achieve the desired defocus.

Alternatively, the near-field lens may be replaced by a substantially transparent high-index material to provide the near-field coupling to the optical medium.

These and other aspects and advantages of the present invention will become more apparent in light of the following detailed description, the accompanying drawings, and the appended claims.

BRIEF DESCRIPTION OF THE DRAWINGS

FIG. 5A is a schematic diagram showing an exemplary near-field system used in a simulation.

DETAILED DESCRIPTION OF THE PREFERRED EMBODIMENTS

Figure 1:
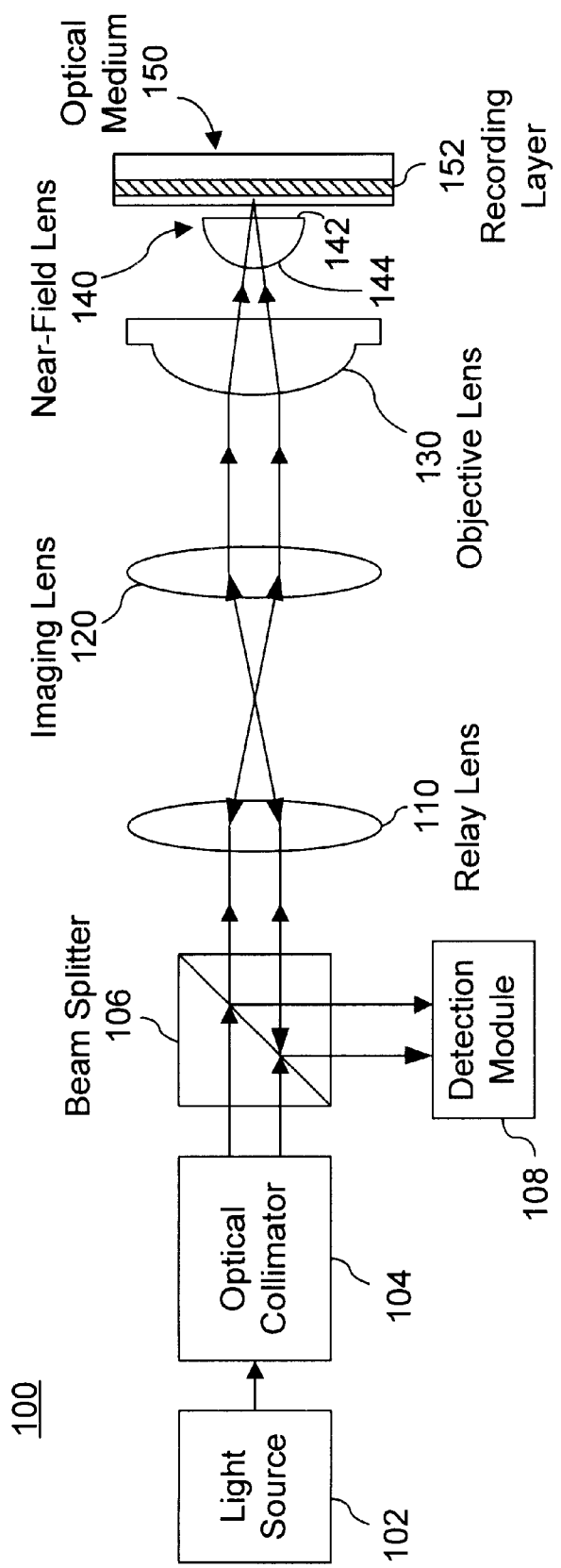
FIG. 1 is a schematic illustration of a simplified optical train of an optical storage system according to one embodiment of the invention.

FIG. 1 shows an optical train 100 of an optical storage system in accordance to an embodiment. A light source 102 such as a laser produces a beam at a specified wavelength for recording and retrieving data. An optical medium 150, e.g., a disk is configured to include a recording layer 152 for data storage. Data is spatially distributed and stored in the recording layer 152 by an encoding method. The medium 150 may be a removable medium or a fixed medium which is held and supported by a medium holder.

An optical beam from the light source 102 is collimated by an optical collimator 104 and then projected to an objective lens 130 by a relay lens 110 and an imaging lens 120. A near-field lens 140 is placed relative to the objective lens 130 to couple the beam to the optical medium 150.

The near-field lens 140 is preferably made of a high-index optical material to produce a large effective numerical aperture ("NA"), i.e., NA=$n_{NFL}\sin\theta_0$, where $n_{NFL}$ is the refractive index of the near-field lens 140 and $\theta_0$ is the maximum ray angle from the lens 140 to the focus point. For example, a solid immersion lens ("SIL") which may be in hemispherical or super-hemispherical configurations, a graded index lens ("GRIN lens") or a "Gradium lens" may be used as the near field lens 140 to achieve an NA up to and greater than unity. FIG. 1 shows a hemispherical SIL as an example of the near-field lens 140 which has a first hemispherical surface 144 and a second flat surface 142. The hemispherical SIL will be used as an exemplary near-field lens in the following description but it should be understood that the same basic principles apply to other types of near-field lenses.

The near-field lens 140 and the optical medium 150 are spaced from each other by an air gap less than one wavelength of the light produced by light source 102. This is known as a "near-field" configuration. Optical energy is coupled between the near-field lens 140 and the optical medium 150 not only by light propagation but also by evanescent waves through the thin air gap therebetween. More specifically, light rays impinging on the flat surface of the SIL 140 at an angle $\sin\theta > 1/n$ are totally internally reflected and the corresponding fields penetrating the flat surface 142 decay exponentially in air. Thus, the optical energy is coupled from the SIL 140 to the optical medium 150 through the air gap by evanescent coupling. For light rays impinging on the flat surface 142 of the SIL 140 at an angle $\sin\theta < 1/n$, the optical energy is coupled to the medium 150 by wave propagation through the air gap.

The present invention combines the large numerical aperture of the near-field lens 140 and the near-field configuration to achieve a beam spot size on the recording layer 152 usually less than one wavelength.

When the system 100 is in the recording mode, an optical beam incident on the optical medium 150 from the SIL 140 interacts with the recording layer 152 by, e.g., heating, this record data at a spot. In the reading mode, an optical beam incident on the optical medium 150 from the near-field lens 140 is modulated by a data spot in the recording layer 152 and is reflected back towards the near-field lens 140. The reflected beam is coupled to the near-field lens 140 by evanescent wave coupling and light propagation through the thin air gap. The objective lens 130, the imaging lens 120, and the relay lens 110 guide the reflected beam to retrace the optical path of the incident beam generated by the light source 102. A beam splitter 106 can be disposed in the optical path to guide the reflected beam to a detection module 108 which has detectors for both data extraction and beam tracking.

The output beam from the light source 102 may be may be polarized and the beam splitter 106 may be a polarizing prism in order to direct nearly all reflected beam to the detection module 108 by using a polarization rotator (e.g., a quarter wave plate) between the beam splitter 106 and the optical medium 150).

Recording data onto the optical medium 150 can be accomplished by either modulating intensity, phase, or polarization of the output beam or by directly modulating the state of the optical medium 150 through thermal or electromagnetic methods. For example, the former may be implemented by using an optical modulator disposed anywhere between the light source 102 and the beam splitter 106. In a readout operation, the reflected beam is modulated to have both beam tracking information and the data stored in the recording layer 152 which are extracted by the detection module 108.

The near-field configuration between the near-field lens 140 and the optical medium 150 can be achieved and maintained by an air-bearing surface formed at the second flat surface 142 and the top surface of the medium 150. In a near-field optical disk drive, the objective lens 130 and the near-field lens 140 can be configured to form a compact and light-wight optical head that is suspended over the optical medium 150 (i.e., an optical disk). In operation, the optical medium 150 is spinning and the optical head is floating over the disk at a height less than one wavelength (e.g., in a range from about 50 nm to about 200 nm).

Certain implementations of the optical train 100 in FIG. 1 and their operations are described in U.S. patent application Ser. No. 08/846,916, "Electro-optical storage system with flying head for near-field recording and reading", filed on Apr. 29, 1997, the entire disclosure of which is incorporated herein by reference to the extent necessary to proper understanding. Optical read/write systems are also described by Alan B. Marchant, in "Optical Recording," Addison-Wesley Publishing (1990).

One aspect described herein is to achieve a significantly reduced or minimized beam spot size at the recording layer 152 in the optical medium 150 rather than at the flat surface 142 of the SIL 140. In a preferred embodiment, the relay lens 110, the imaging lens 120 and the objective lens 130 are configured to focus an incident optical beam to a plane in the air beyond the location of the recording layer 152 by a specified refocusing distance in absence of the near-field lens 140 and the optical medium 150. The refocusing distance is determined in such a way that the beam interaction with the near-field lens 140, the thin air gap and the optical medium 150 shifts the waist of the beam onto or near the recording layer 152.

The evanescent coupling and the effects of the near-field lens 140, the air gap, and the optical medium 150 on the optical beam can be characterized and analyzed based on a numerical solution to Maxwell's wave equations as will be described. However, certain effects such as refraction effect and optical aberrations associated with the near-field lens 140 may be analyzed in a simplified way to illustrate the necessity of the refocusing and to estimate the desired refocusing distance.

Figures 2, 3:
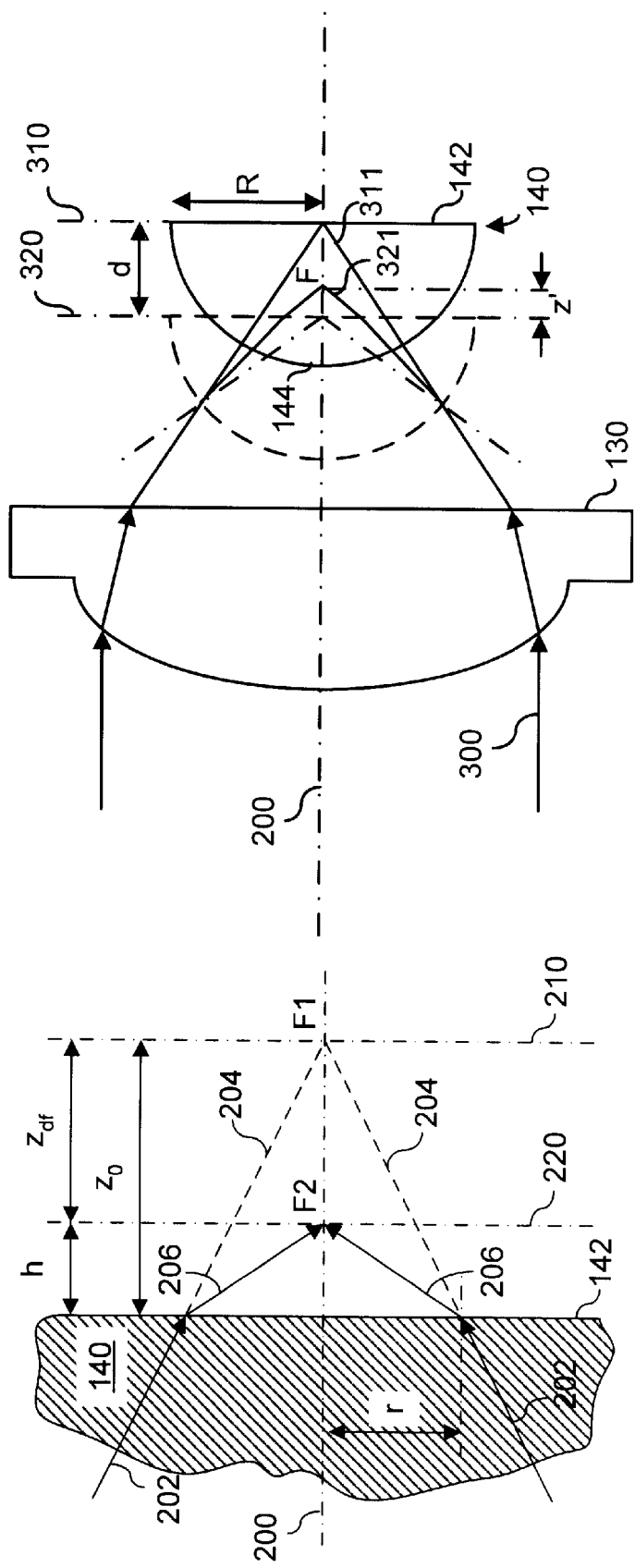
FIG. 2 is a schematic illustration showing the refocusing effect caused by refraction at the flat surface of the near-field lens.
FIG. 3 is a schematic illustration showing the refocusing caused by the refraction effect at the spherical surface of the near-field lens.

FIG. 2 is a schematic showing the optical refraction at the interface of the second flat surface 142 of the SIL 140 and the air without the optical medium 150. Assume a convergent beam 202 from the objective lens 130 is incident on the surface 142 at an angle e which is smaller than the critical angle $\theta_c = \sin^{-1}(1/n)$ for the total internal reflection at the interface. Without the refraction effect, the beam 202 would continue to propagate as beam 204 to focus at a point F1 in a plane 210. However, the refraction at the surface 142 bends the beam 202 to propagate in the air as beam 206. The flat surface 142 shifts the focus point closer to the near-field lens 140 from F1 to F2 at a plane 220. Hence, in order to focus a beam to a desired focus point F2 in the plane 220, the objective lens 130 should focus the beam 202 at the point F1 rather than F2. With respect to the target focus plane 220, the input beam 202 is defocused by a distance, $z_{rf}$, beyond the desired focus plane 220.

Assume the target focus plane 220 and the plane are spaced from the surface 142 by h and $z_0$, respectively, then $$\sin\theta_2 = n_{NFL} \sin\theta_1 \qquad (1)$$

where $n_{NFL}$ is the index of refraction of the near-field lens 140. Since the radius of the input beam 202 is $r = h\tan\theta_2$ and $r = z_0 \sin\theta_1$, $z_0$ can be expressed as a function of h, $n_{NFL}$ and $\theta_1$:

$$z_0 = n_{NFL} h \frac{\cos\theta_1}{\sqrt{1 - n_{NFL}^2 \sin^2\theta_1}}. \qquad (2)$$

The refocusing distance $z_{rf} = z_0 - h$. For small incident $\theta_1 \ll 1$ as in the paraxial approximation, the refocusing distance is $$z_{rf} = z_0 - h = (n_{NFL} - 1)h. \qquad (3)$$

As the angle $\theta_1$ increases, the distance $z_{rf}$ becomes larger than $(n_{NFL}-1)h$. This is caused by the spherical aberration in the air gap between the near-field lens 140 and the optical medium 150.

The refocusing effect due to the spherical aberration may be accounted for based on the standard aberration theory. The lowest order (i.e., the third-order) spherical aberration $W_{040}$, is given by $$W_{040} = -\frac{1}{8} r A^2 \Delta\left(\frac{u}{n_{NFL}}\right), \qquad (4)$$

where r is the marginal ray height at the refraction surface 142, $A = n \sin\theta = n' \sin\theta'$ is the refraction invariant at the surface 142 given by Snell's law, u is the marginal ray angle (e.g., $u = \theta_c$), and $\Delta$ indicates a change in the marginal ray angle u. An additional amount of defocus $Z_{040}$ required to compensate for this spherical aberration is given by $$W_{020} = -W_{040} = \frac{1}{2} NA_c^2 z_{040}, \qquad (5)$$

wherein $NA_c = n_{NFL} \sin\theta_c$ is the effective numerical aperture for the propagating waves in the air gap passing through the SIL 140. Thus, the focusing distance, which includes both the refraction and the above third-order spherical aberration, is $z = z_o + z_{010}$.

The spherical surface 144 of the SIL 140 also shifts the focus of the beam from the objective lens 130. This effect is illustrated in FIG. 3. Assume the objective lens 130 and the SIL 140 are spaced from each other so that a beam 300 is focused by the objective lens 130 to the center O of spherical surface 144 in the flat surface 142 of the SIL 140. In this configuration, each ray (e.g., 311) of the beam is perpendicular to the spherical surface 144 and the propagation direction of each ray is not affected by the spherical surface 144. When the objective lens 130 and the near-field lens 140 are moved towards each other by a distance d, light rays (e.g., 321) entering the spherical surface 144 are no longer normal to the surface 144 except the ray along the optic axis 200. The refraction at the spherical surface 144 shifts the focus of the beam from the point O to a point F in a plane 320 outside the near-field lens 140.

When the shifted distance d is much smaller than the radius R of the spherical surface 144, the corresponding focus shift is approximately given by $$\Delta f \approx \frac{d}{n_{NFL}}. \qquad (6)$$

Therefore, the actual focusing distance corresponding to $z = z_o + z_{040}$ is $$z' = n_{NFL}(z_0 + z_{040}), \qquad (7)$$

and the refocusing distance is $$z_{rf} = n_{NFL}(z_0 + z_{040}) - h. \qquad (8)$$

The spherical aberration due to the curvature of the near-field lens 140 may introduce an additional shift in the focus of the beam, which is proportional to the fourth power the numerical aperture of the objective lens. This additional shift is much less significant than the aberrations due to the air gap and hence may be neglected.

Consider an exemplary near-field system having an objective lens with a numerical aperture $NA_{obj} \approx 0.65$ and a solid immersion lens with $n_{NFL} \approx 2$. Assume the recording layer is at a distance $h = 0.1$ $\mu$m away from the flat surface of the near field lens. The focus distance is $z_0 = 0.2$ $\mu$m.

Since the critical angle at the flat surface of the near-field lens is about 30 degrees, the $NA_c$ of the near-field lens is 0.5. Hence, the effective NA of the objective lens and the near-field lens for the propagating part of the input optical beam is 0.5. The parameters for computing $W_{040}$ of Equation (4) are given as follows:

$r = z_C \tan 30° = 0.1154$ $\mu$m;

$A = n_{NFL} NA_c = 2 \times 0.5 = 1$;

$\Delta(u/n_{NFL}) = NA_c(n^2_{NFL} - 1)/n_{NFL} = 0.75$; and $W_{040} = 11$ nm.

According to Equation (5), $z_{040} = 0.088$ $\mu$m. Neglecting the effect of the spherical aberration due to the curvature of the near-field lens 140, the focus distance is estimated as $$z = z_0 + z_{040} = 0.2 \text{ }\mu m + 0.088 \text{ }\mu m = 0.288 \text{ }\mu m. \qquad (9)$$

Due to the refraction effect at the spherical surface of the near-field lens, the actual focus distance is $z' = z n_{NFL} = 0.576$ $\mu$m, more than 5 times the distance of the recording layer from the flat surface of the near-field lens.

The above analysis indicates that the refocusing is a significant effect and proper refocusing is necessary in order to reduce or minimize the beam spot size at the recording layer. The refocusing can be more accurately analyzed using vector diffraction models to account for the evanescent coupling and the effects of the near-field lens 140, the air gap, and the optical medium 150. In particular, the evanescent coupling in the near-field configuration and the light propagation in the optical medium with a multilayer structure cannot be adequately included in the above simplified analysis.

Various vector diffraction models may be used to analyze the refocusing effect and determine the proper amount of refocusing based on the properties and configurations of the objective lens, the near-field lens, the air gap, and the optical medium. One approach is based on the paraxial approximation. See, for example, Mansuripur, "Certain Computational Aspects of Vector Diffraction Problems", J. Opt. Soc. Am. A6(5), June 1989, and "Analysis of Multilayer Thin-Film Structures Containing Magneto-Optic and Anisotropic Media at Oblique Incidence Using 2×2 Matrices," J. Appl. Phys., Vol. 67, No. 10 (May 1990), which are incorporated herein by reference.

Figure 4A:
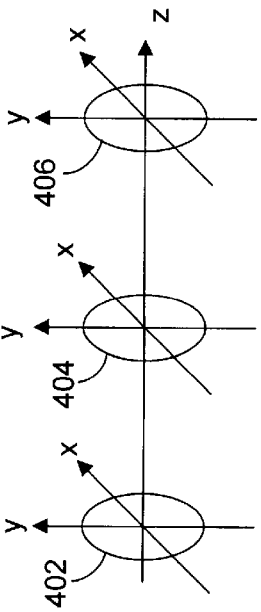
FIG. 4A is a diagram showing a coordinate system used in a vector diffraction model for determining the refocusing.

FIG. 4A is a diagram showing the coordinate system used in this paraxial vector diffraction model analysis. An initial plane 402 is selected as a reference plane at which the local optical field is known. Referring to FIG. 1, the flat surface 142 of the near-field lens 140 may be chosen as the plane 410. Plane 404 is the target plane at which the beam size is significantly reduced or minimized. In the following description, the recording layer in the optical medium is used as the plane 404. Plane 406 is the focus plane in absence of the near-field lens and the optical medium.

For a given input power at the initial plane 402, the intensity of the beam on the axis (i.e., the peak intensity) at the recording layer increases as the beam size decreases and vice versa. The position of the plane 406 is adjusted relative to the plane 402 so that the peak intensity at the target plane 404 is maximized. This configuration produces a minimized beam size at the target plane 404. Furthermore, the reflected power to the signal detectors and the tracking detectors, which are in the detection module 108 of the system 100 in FIG. 1, tends to approach a maximum when the peak intensity at the recording layer is maximum.

Figure 4B:
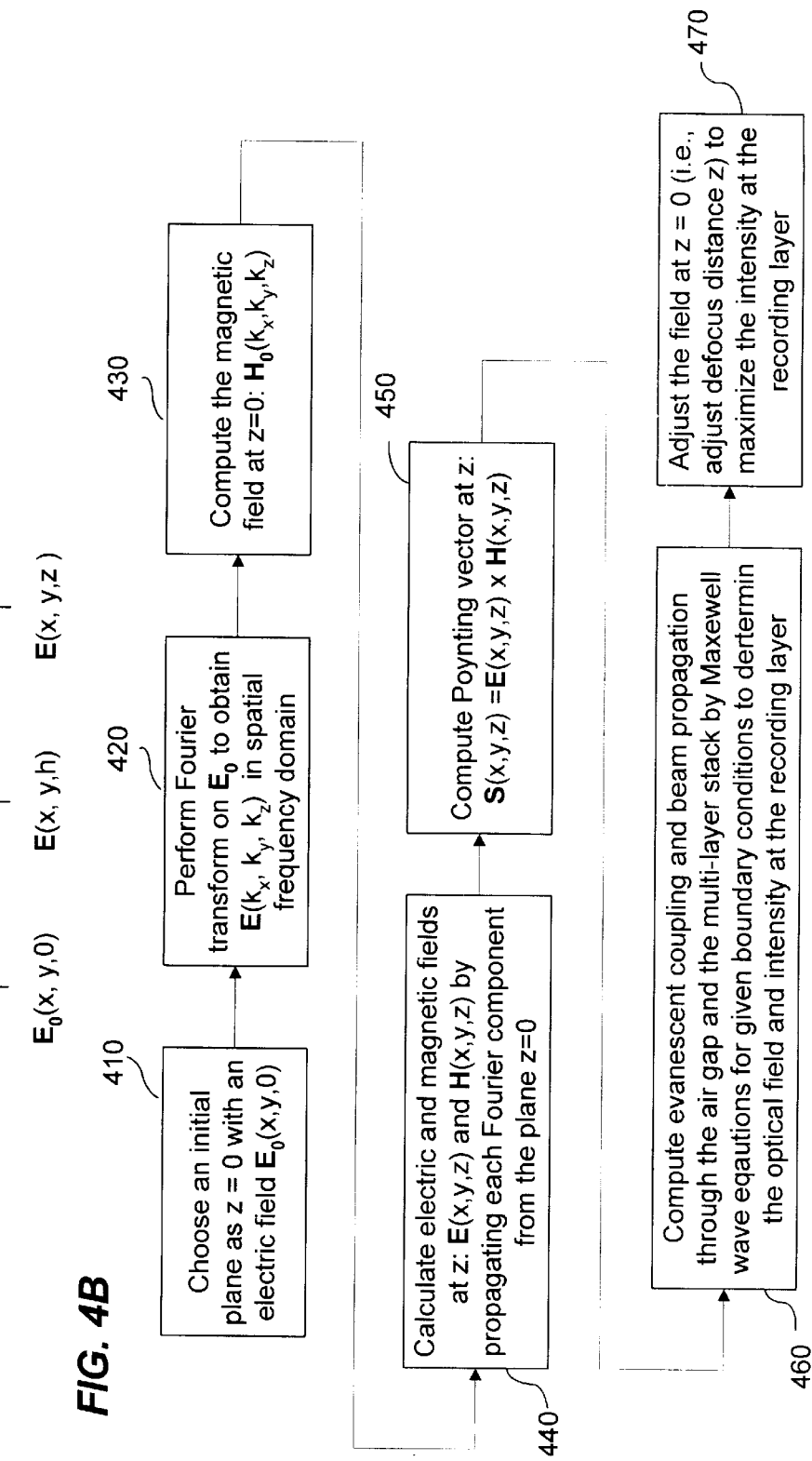
FIG. 4B is a flowchart showing a method for determining proper amount of refocusing based on a vector diffraction model.

FIG. 4B is a flowchart showing one process for determining the refocusing parameter z based on the above paraxial vector diffraction model. At step 410, an initial plane 402 (e.g., the flat surface 142 of the lens 140) is selected and the electrical field $E_0(x, y, 0)$ is determined. At step 420, a Fourier transform is performed on the field $E_0(x, y, 0)$ to produce a respective field $E_0(k_x, k_y, k_z)$ in spatial frequency domain where the propagation vector $k=(k_x, k_y, k_z)$. The magnetic field at the plane 402 is then computed at step 430: $H_0(k_x, k_y, k_z) = k \times E_0(k_x, k_y, k_z)$.

The fields $E_0(k_x, k_y, k_z)$ and $H_0(k_x, k_y, k_z)$ are comprised of various Fourier components each of which can be treated as a planar wave. At step 440, each Fourier component is propagated by applying inversed Fourier transforms and superimposing all components at a position z. This produces the fields $E(x, y, z)$ and $H(x, y, z)$ at the position z. At step 450, the Poynting vector is calculated (i.e. $S=E \times H$) in order to calculate the ray direction due to the effect of the objective lens.

Next at step 460, solve Maxwell equations at the air gap and the multilayer stack of the optical medium. This step accounts for the evanescent wave coupling and wave propagation through the thin air gap and the light propagation in the multilayers in the optical medium for each plane wave. Boundary conditions at each interface is determined and used for solving the solutions. The optical field $E(x, y, h)$ and $H(x, y, h)$ at the recording layer (plane 404) can be calculated and thereby the optical intensity $I(x, y, h)$ and the spot size at the full width half maximum is obtained.

Finally, at step 470, the propagation distance z is adjusted so that the field $E_0(x, y, 0)$ or $E_0(k_x, k_y, k_z)$ produce a maximum intensity $I(x, y, h)$. This results in the desired focusing z.

The previous example has been further analyzed numerically using the process in FIG. 4B. The simulation indicates that a focus at $z=0.292$ $\mu$m from the flat surface of the near-field lens is needed to minimized the beam spot size at $h=0.1$ $\mu$m. Thus, the previous estimation of $z=0.288$ $\mu$m is in good agreement with this more accurate analysis.

Further including the refraction effect of the spherical surface 144 of the SIL 140 on the focus point when rays entering the surface 144 are not at normal incidence, the actual focusing distance is $z'=zn_{NFL}$ and the respective refocusing distance is $(zn_{NFL}-h)$ beyond the recording layer 152.

A near-field optical storage system having an objective lens, a SIL lens and a multilayer magneto-optic medium can be analyzed by using the process in FIG. 4B to include effects such as evanescent wave coupling and the multilayer effect. FIG. 5A illustrates an exemplary system 500 using the same objective lens 501 and the near-field SIL 502 as in the previous example. A medium 503 has a top diamond-like carbon dielectric layer 510 of 30 nm thick, a $SiO_2$ layer 520 of 100 nm thick, a magneto-optic recording layer 530 of 20 nm thick and an aluminum reflective layer 540. These layers are formed on a substrate 550. The bottom flat surface of the near-field SIL 502 is spaced above the top diamond-like carbon dielectric layer 510 by H=100 nm.

Figure 5B:
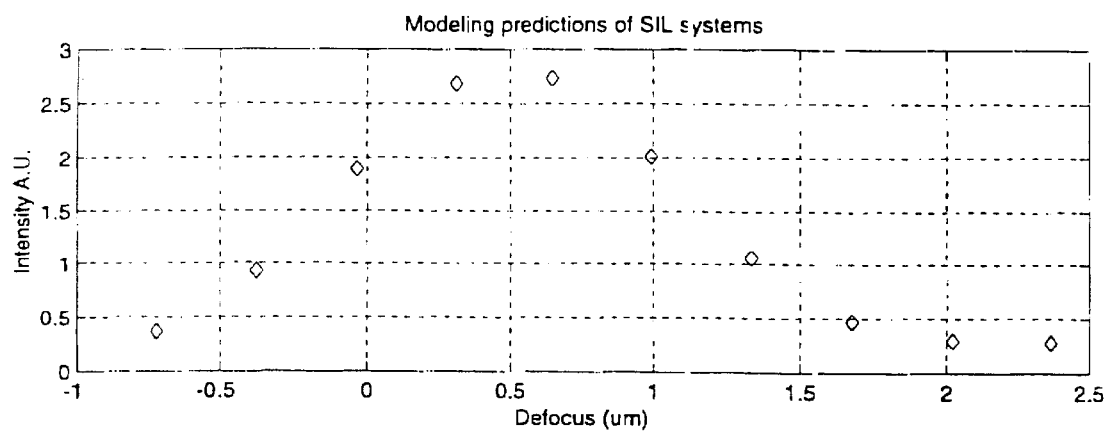
FIGS. 5B and 5C are simulation results of the system in FIG. 5A based on the method in FIG. 4B.

FIG. 5B is a chart showing the peak optical intensity at the interface of the recording layer 530 and the reflective layer 540 as a function of focusing distance z with respect to the bottom of the SIL 502. The simulation indicates that a focusing distance $z=0.5$ $\mu$m is required to achieve the maximum peak intensity.

Figure 5C:
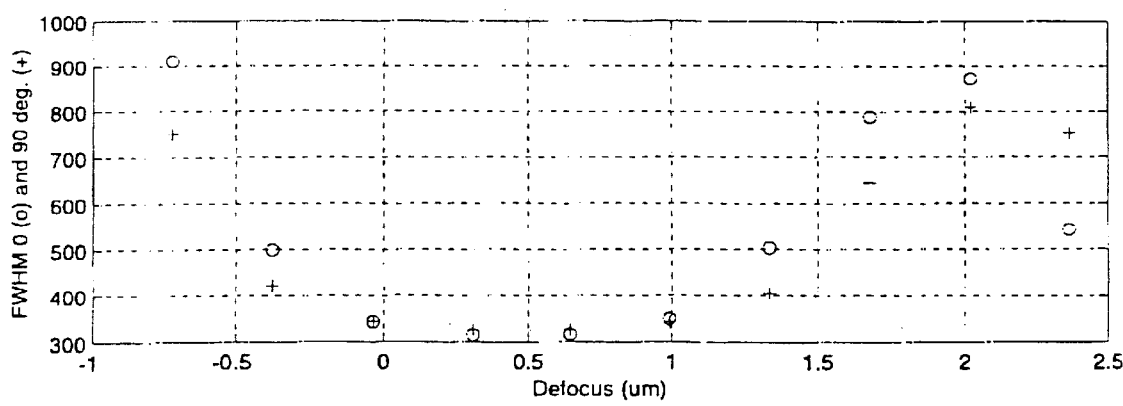

FIG. 5C further shows the respective full width of the beam spot size at the half maximum intensity as a function of the refocusing distance z. The circles and crosses respectively represent the simulation results for two mutually orthogonal polarizations. The simulation shows that he beam spot size reaches a minimum at $z=0.5$ $\mu$m. This is the same refocusing distance as required to obtain maximum intensity at the recording layer.

This defocus is much larger than the result of $z=0.292$ $\mu$m without the 100-nm air gap and the multilayer medium. The increased defocus is caused by additional contributions from the evanescent coupling and the interference effect in the multilayer medium. Further including the refraction effect of the spherical surface of the SIL 502, the actual focusing distance is $z'=z$ $n_{SIL}=2 \times 0.5$ $\mu m=1$ $\mu$m, i.e., about 850 nm beyond the recording layer 530.

Another approach for determining the proper amount of refocusing is based on a non-paraxial vector model. See, Richards and Wolf, "Electromagnetic diffraction in optical systems II. structure of the image field in an aplanatic system," Proc. Roy. Soc. London Ser. A 253, 358–379 (1959) and Ichimura, Hayashi and Kino, "High-density optical recording using a solid immersion lens," Applied Optics, Vol. 36, pp.4339–4348 (1997), which are incorporated herein by reference. This approach can be illustrated by analyzing the system 500 shown in FIG. 5A.

Referring to FIG. 5A, it is assumed that the objective lens 501 and near-field lens 502 do not have aberrations although they can be configured to defocus a beam. The optical field of an input beam at a pupil plane 504 is specified, which is in general linearly polarized and apodized with a Gaussian variation. It is specified that the beam is focused at a point distance $z_o$, from the flat surface of the near-field lens 502. The fields in the lens are expressed as a sum of converging wavelets converging to the focal point. Each one of these wavelets is a quasi-plane wave. The electric field and magnetic field transmission and reflection coefficients can be calculated at each layer of air and multi-layer medium beyond the flat surface of the near-field lens 502, as well as at each interface between the layers. Hence, the total transmission coefficient of each wavelet to the recording layer 530 or any other layer of interest can be determined. The contributions of the wavelets are then summed to determine the total fields and the Poynting vector $S_z$, i.e., the power intensity in the z-direction. This power intensity is determined in terms of the power intensity incident on the surface of the near-field lens, so that the device efficiency and point spread function at any plane can be evaluated. In addition by making use of the reflection coefficients of the wavelets, the reflected fields and the rotated components of the reflected wave fields can he determined at the surface of the recording material 530 or at the pupil plane 504.

The intensity on axis and spot size for any polarization direction as a function of $z_o$ and the optimum value of $z_o$ for maximum intensity on axis at the recording layer 530 can be determined by varying the focal position $z_o$. It is also possible to determine the spot size and reflected intensity at the surface of the recording material as a function of $z_o$.

The results of this alternative approach are similar to the results obtained from the approach shown in FIG. 4B. The first technique is flexible and can be applied to many different configurations. The second technique is more specialized to the near-field configuration and can provide an accurate analysis since it is nonparaxial. The present invention may be implemented based on the analysis of both techniques or any other suitable technique.

Referring back to the near-field system 100 in FIG. 1, the above analysis shows that the optical beam incident to the near-field lens 140 is preferably defocused by a proper amount to achieve a minimized beam spot size in the recording layer 152. A number of techniques may be implemented to achieve such refocusing.

One method uses a collimated beam as the input to the objective lens and moves the objective lens 130 and the near-field lens 140 close to each other until a desired refocusing is achieved.

Another method also uses a collimated beam as the input to the objective lens 130 and forms a built-in phase profile in the objective lens 130 to effect a desired refocusing. For example, the objective lens 130 may be an aspherical lens having a surface curvature to effect the phase profile. Alternatively, this phase profile may be disposed anywhere in the optical train.

Figure 6:
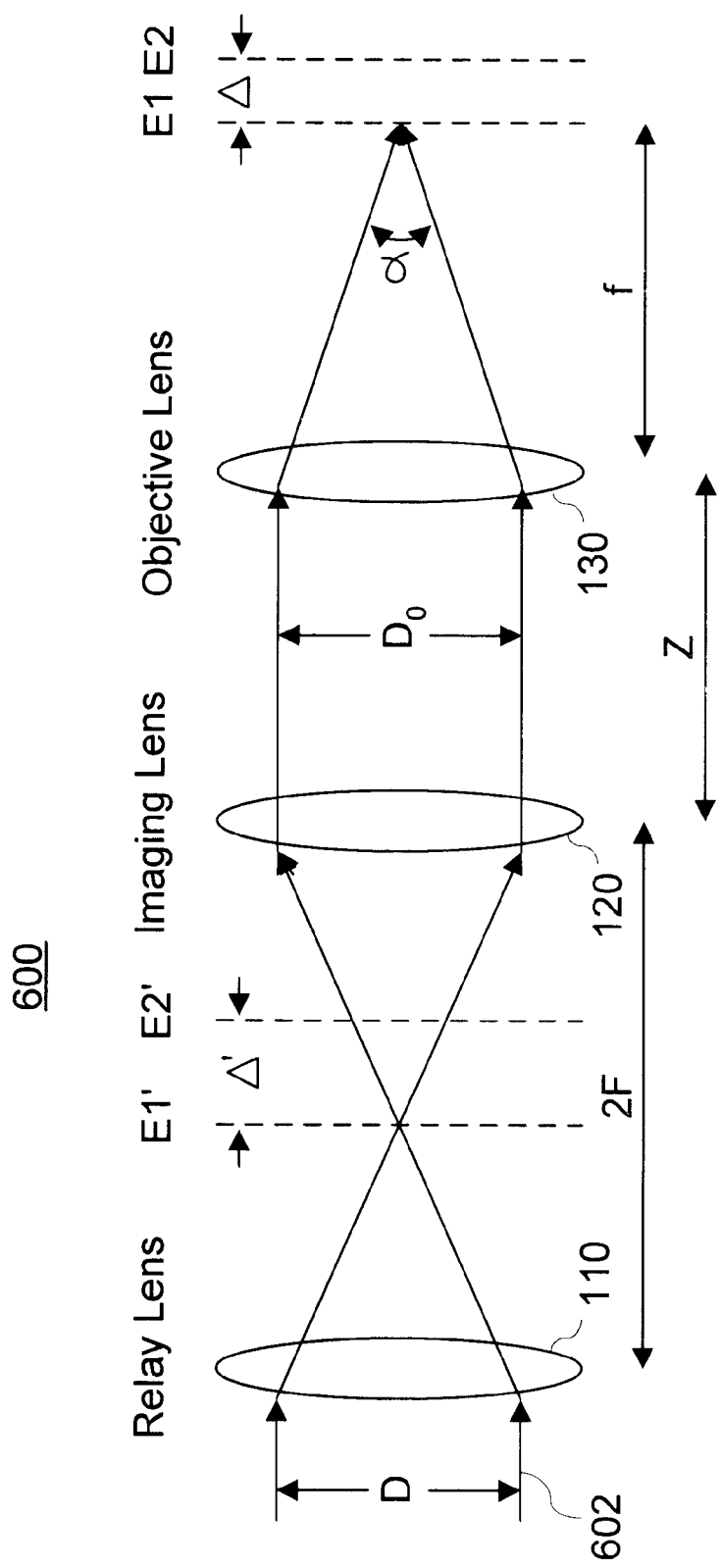
FIG. 6 is a schematic diagram showing refocusing by the relay lens.

Furthermore, the relay lens 110 and the imaging lens 120 may be configured to produce a divergent beam with a proper amount of divergence to achieve a desired refocusing. FIG. 6 is a schematic diagram illustrating this technique. Assume the relay and imaging lenses each have a focal length F. When the relay lens 110 and the imaging lens 120 are separated by 2 F, a collimated incoming beam 602 is focused at the focal plane E1 of the objective lens 130. Plane E1' is the image of the focal plane E1 by the objective lens 130 and the imaging lens 120. To move the focused spot from E1 to E2 by a distance Δ, the relay lens 110 can be moved towards the imaging lens by a distance Δ':

$$\Delta' = \frac{F^2 \Delta}{f^2 + [F + f - Z]\Delta} \approx \frac{F^2 \Delta}{f^2}. \quad (10)$$

where f is the focal length of the objective lens 130 and the approximation is valid when $f^2 >> [F+f-Z]\Delta$. The beam divergent angle, i.e., the full marginal ray angle in front of the objective lens 130, is given by $$\alpha = \frac{D\Delta'}{F^2} = \frac{D\Delta}{f^2 + [F + f - Z]\Delta} = \frac{D\Delta}{f^2}. \quad (11)$$

The beam size at the objective lens 130 is $$D_0 = D\left[1 + \frac{Z\Delta'}{F^2}\right] = D\left[1 + \frac{Z\Delta}{f^2 + (F + f - Z)\Delta}\right] \approx D\left[1 + \frac{Z\Delta}{f^2}\right]. \quad (12)$$

To achieve the proper refocusing in the example shown in FIG. 5A, Δ=0.5 μm. This corresponds to a marginal ray angle of about 0.015 degree. This angle is small and does not cause any significant spherical aberration. In addition, the increase in the beam size at the objective lens 130 is less than 2% compared to the collimated incidence. Hence, the relay lens 110 can be used to provide a simple and effective refocusing solution.

Although the present invention has been described in detail with reference to the preferred embodiments, various modifications and enhancements may be made without departing from the spirit and scope of the invention. For example, the preferred embodiments are described to use a hemispherical SIL as the near-field lens. Another form of SIL having a flat surface spaced from the center of the spherical portion by a distance equal to the radius of the curvature divided by the refractive index of the SIL may be used. In addition, other forms of the near-field lens may also be used.

Figure 7:
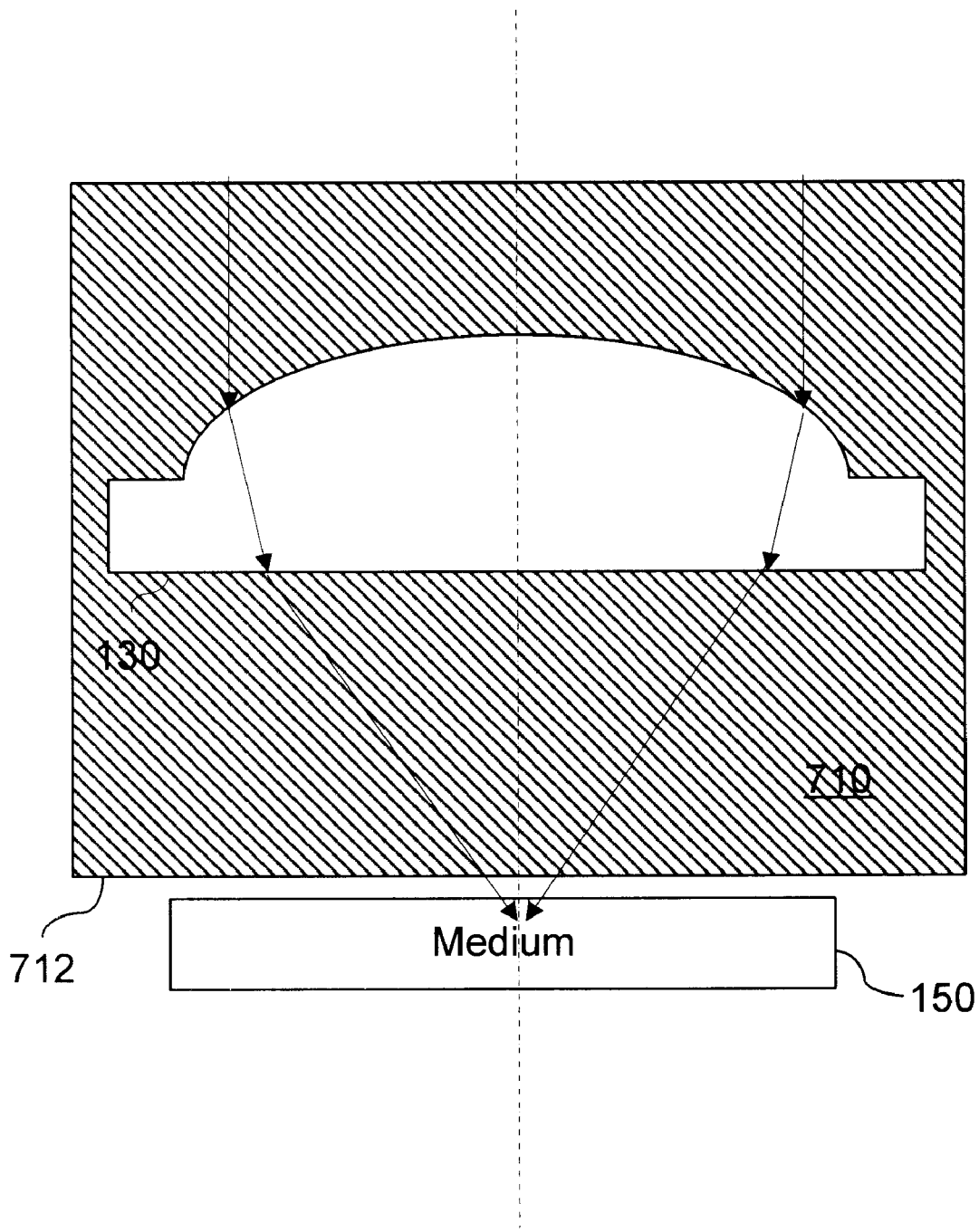
FIG. 7 is a schematic diagram of an alternative implementation of the near-field coupling.

The near-field lens may be eliminated by using a high-index medium as a near-field coupling element between the optical medium and the objective lens. The index of refraction of the medium is preferably higher than that of the objective lens. FIG. 7 illustrates such a configuration in which the objective lens 130 is immersed into a high-index liquid 710 which may be held by an optically transparent liquid-containing element. The bottom flat surface 712 of the liquid coupling element 710 is spaced from the medium 150 by a fraction of the wavelength to form a near-field configuration. However implemented, the same techniques of determining a proper amount of refocusing are applicable. For example, the technique shown in FIG. 4B can be used to determine the desired refocusing distance in FIG. 7. The effect caused by the curvature of the hemispherical surface of the SIL, however, is no longer applicable.

These and other variations are intended to be encompassed by the following claims.

What is claimed is:

1. A near-field optical system, comprising:
   a medium holder adapted to hold an optical storage medium with a recording layer at a specified position; and
   an optical module to couple radiation to and from said medium holder and configured to include an objective lens and a near-field coupling element to guide an optical beam of a selected wavelength to said medium holder, said near-field coupling element disposed relative to said medium holder to effect evanescent optical coupling between said optical module and the optical medium placed in said medium holder, wherein said objective lens and said near-field coupling element are designed and positioned relative to each other to correct effects caused by refraction, lens aberrations, evanescent optical coupling, and a structure of the optical medium to focus said optical beam to a focusing plane spaced from said near-field coupling element by a predetermined distance greater than a distance between a location of the recording layer and the near-field element in absence of said optical medium and to focus said optical beam to or near the recording layer,
   wherein said optical module comprises a relay lens and an imaging lens for coupling said optical beam to said objective lens and said near-field coupling element, said relay lens and imaging lens spaced from each other by a distance smaller than a sum of focal lengths thereof to at least in part cause said beam to focus at said predetermined distance.

2. A system as in claim 1, wherein said near-field coupling element is a near-field lens.

3. A system as in claim 2, wherein said near-field lens is a solid immersion lens having a substantially flat optical surface which is spaced from said optical medium by a fraction of said selected wavelength.

4. A system as in claim 3, wherein said solid immersion lens is a hemispherical lens.

5. A system as in claim 4, wherein said hemispherical solid immersion lens is spaced relative to said objective lens closer than a distance at which light rays from said objective lens enter the hemispherical surface at normal incidence.

6. A system as in claim 1, wherein said optical module is configured to have an aspherical phase profile operable to at least in part cause said beam to focus at said predetermined distance.

7. A system as in claim 6, wherein said objective lens is an aspherical lens configured to effect said aspherical phase profile.

8. A method for constructing and operating a near-field optical storage system, comprising:

providing a medium holder to hold an optical storage medium at a specified plane;

guiding an optical beam of a selected wavelength to said medium holder by using an optical module disposed relative to said medium holder and configured to include an objective lens and a near-field coupling element, wherein said near-field coupling element is disposed relative to said medium holder to effect evanescent optical coupling between said optical module and said optical medium when placed in said medium holder and wherein said recording plane is spaced from said near-field coupling element by a first distance;

configuring said optical module to correct at least an effect by said evanescent optical coupling so as to focus said optical beam to a focusing plane spaced from said near-field coupling element by a second distance greater than said first distance in absence of said optical medium and to focus said optical beam to or near said recording layer when said optical medium is placed in said medium holder, wherein said optical module comprises a relay lens and an imaging lens for coupling said optical beam to said objective lens and said near-field coupling element, and said method further comprising:

separating said relay lens and imaging lens from each other by a distance smaller than a sum of focal lengths thereof to effect a proper amount of divergence in said beam so as to focus said beam said focusing plane in absence of said optical medium.

9. A method as claimed in claim 8, wherein said near-field coupling element includes a near-field lens located between said objective lens and said medium and is spaced from said medium by a fraction of said selected wavelength.

10. A method as in claim 9, wherein said near-field lens includes a solid immersion lens.

11. A method as in claim 8, wherein said near-field coupling element includes a hemispherical solid immersion lens and further comprising:

disposing said hemispherical solid immersion lens relative to said objective lens closer than a distance at which light rays from said objective lens enter the hemispherical surface at normal incidence so as to focus said beam at said focusing plane in absence of said optical medium.

12. A method as in claim 8, further comprising effecting a phase profile in said optical module to cause said beam to focus at said focusing plane in absence of said optical medium.

13. A method as in claim 12, wherein said phase profile is embedded in said objective lens.

14. A method as in claim 8, wherein said near-field coupling element includes a substantially transparent material which has a refractive index higher than said objective lens and said objective lens is immersed in said transparent material.

15. A near-field optical system, comprising:

an optical storage medium having an active layer for storing and writing data; and an optical module having an objective lens and a near-field coupling element disposed with respect to each other to guide an optical beam of a selected wavelength to said medium, said near-field coupling element disposed less than said selected wavelength relative to said medium to effect evanescent optical coupling between said optical module and said medium, wherein said optical module is configured to correct at least an effect of said evanescent optical coupling so as to focus said optical beam to or near said active layer, wherein said optical module comprises a relay lens and an imaging lens for coupling said optical beam to said objective lens and said near-field coupling element, said relay lens and imaging lens spaced from each other by a distance smaller than a sum of focal lengths thereof to at least in part cause said beam to focus at said predetermined distance.

16. A system as in claim 15, wherein said near-field coupling element is a solid immersion lens having a substantially flat optical surface which is spaced from said optical medium by a fraction of said selected wavelength.

17. A system as in claim 16, wherein said solid immersion lens is a hemispherical lens and is spaced relative to said objective lens closer than a distance at which light rays from said objective lens enter the hemispherical surface at normal incidence.

18. A system as in claim 15, wherein said optical module is configured to have an aspherical phase profile operable to at least in part cause said beam to focus at said predetermined distance.

19. A method for constructing and operating a near-field optical storage system, comprising:

providing a medium holder to hold an optical storage medium at a specified position;

placing a recording layer in said optical medium at a recording plane;

guiding an optical beam of a selected wavelength to said medium holder by using an optical module disposed relative to said medium holder and configured to include an objective lens and a near-field coupling element, wherein said near-field coupling element is disposed relative to said medium holder to effect evanescent optical coupling between said optical module and said optical medium when placed in said medium holder and wherein said recording plane is spaced from said near-field coupling element by a first distance;

configuring said optical module to correct at least an effect by said evanescent optical coupling so as to focus said optical beam to a focusing plane spaced from said near-field coupling element by a second distance greater than said first distance in absence of said optical medium and to focus said optical beam to or near said recording layer when said optical medium is placed in said medium holder; and controlling the optical beam incident to the objective lens to be divergent to compensate for the effect of the evanescent coupling between the near-field coupling element and the optical medium on beam focusing.

* * * * *